E. FOGG.
ARTIFICIAL TEETH.
APPLICATION FILED OCT. 31, 1914.
1,227,602. Patented May 29, 1917.
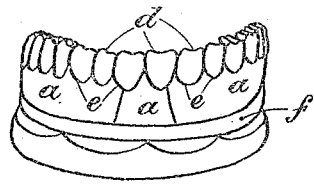
FIG. 1.
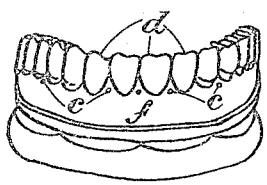
FIG. 2.
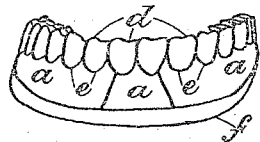
FIG. 3.
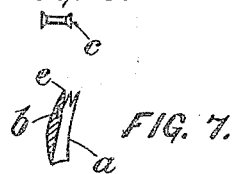
FIG. 6.
FIG. 7.
FIG. 4.
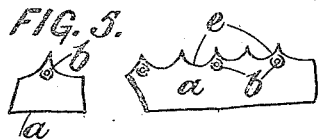
FIG. 5.
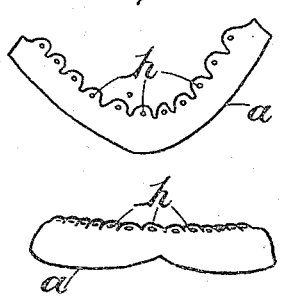
FIG. 10.
FIG. 11.
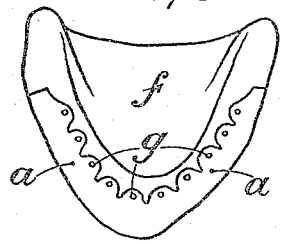
FIG. 8.
FIG. 9.
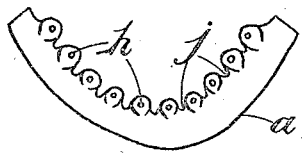
FIG. 12.
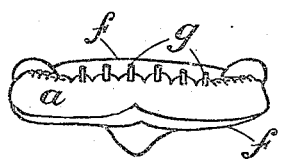
FIG. 13.
Witnesses:
J. J. Wallace
E. E. Nelson
Inventor:
Ernest Fogg,
By his Attys.
Fraser, Twink & Myers

UNITED STATES PATENT OFFICE.

ERNEST FOGG, OF NEWCASTLE-UPON-TYNE, ENGLAND.

ARTIFICIAL TEETH.

1,227,602.  Specification of Letters Patent.  Patented May 29, 1917.

Application filed October 31, 1914. Serial No. 869,562.

*To all whom it may concern:*

Be it known that I, ERNEST FOGG, a subject of the King of Great Britain and Ireland, residing at 58 Jesmond road, in the city and county of Newcastle-upon-Tyne, England, have invented certain new and useful Improvements in Artificial Teeth, of which the following is a specification.

This invention relates to artificial teeth. Hitherto the fixing of artificial gum-block teeth (*i. e.*, teeth fixed to the gum-blocks in the process of manufacture) or of gum-blocks to which teeth can be attached, during the process of fitting teeth to a denture, crown, bridge or bar has been attended with considerable risk of cracking, breaking, discoloring or otherwise damaging the gum-blocks or gum-block teeth, as, where pins are used, the pins have to be soldered to the metal plate or packed around with vulcanite or other similar material forming the denture, or, where diatoric gum-block teeth are employed, the vulcanite or other material of the denture has to be pressed into the recesses in the gum-block teeth with considerable force and then vulcanized, in each case the soldering, heating, vulcanizing or other operation being performed with the gum-blocks and teeth or gum-block teeth in position in the mold or flask.

The object of the present invention is to provide a method of fixing gum-blocks or gum-facings to a denture whereby ordinary stock teeth can be employed with the facings and have all the advantages of continuous gum work, and whereby the necessity of vulcanizing, heating, soldering or similarly treating the work with the gum-facings in position in obviated.

According to this invention I provide gum-facings which can be temporarily attached in proper position with regard to the usual foundation plate of the denture to permit of the teeth being adjusted to said facings and the facings then removed before the soldering, casting, heating, vulcanizing or like operation is performed, and, when said operation is completed, replaced and permanently secured in position upon the denture.

I will fully describe my invention with reference to the accompanying drawings wherein—

Figure 1 is a perspective view of a denture showing the teeth and gum-facings, the latter being only temporarily attached thereto;

Fig. 2 is a similar view to Fig. 1 showing the gum-facings removed before vulcanizing, the teeth remaining in position on the denture; and Fig. 3 is a similar view to Figs. 1 and 2 showing the gum-facings permanently secured in position on the denture.

Fig. 4 is a face view of the gum-facings shown in Figs. 1 and 3, removed from the denture; and Fig. 5 is a rear view of same;

Fig. 6 is a view of one of the double-headed pins; and

Fig. 7 is a section of one of the gum-facings;

Fig. 8 is a plan and Fig. 9 a face view illustrating a modified form of my improved gum-facing applied to a denture; and Figs. 10 and 12 are plans and Figs. 11 and 13 face views respectively of two forms of the gum-facings shown in Figs. 8 and 9.

According to the embodiment of this invention illustrated in Figs. 1 to 7 of the drawings, I provide the back of each gum-facing *a* with a series of recesses or sockets *b* (Fig. 5) into which are adapted to fit double-headed pins *c* (Fig. 6), the recesses *b* being large enough to admit the heads of the pins.

In practice, in vulcanite work, I first place the metal, wax or other plate forming the foundation of the denture in position as usual on the model of the patient's mouth. Where a metal plate is used the plate may be either struck up or cast and forms a permanent foundation, but where wax is employed the foundation is only temporary. I then select and slightly oil gum-facings *a* of suitable size, shape and color, and detachably fit into the recesses *b* in the backs thereof (for example by means of putty or similar substance) the double-headed pins *c* above described and adjust the gum-facings to said foundation with the pins in position. Teeth *d* of suitable stock size, shape and color can now be adjusted to the required angles in the sockets *e* provided in the facings and the facings, pins and teeth temporarily fixed in position by wax or other suitable material as shown in Fig. 1. The gum-facings are then removed leaving the pins *c* and the teeth held by wax in position on the model against the metal or wax plate as shown in Fig. 2. The fixing of the gum-facings to a metal foundation plate is made by screwing small pins into the metal plate onto which the facings can be cemented by placing the sockets in the backs of the facings onto the pins referred to. The work is now ready for flasking. The plaster for flasking purposes in the case of vulcanite work is carefully manipulated around the exposed parts of the pins c and the bed of wax or metal which is to form the bed for the facings, and if the teeth are to be received in the first part of the flask, around and over the teeth. The plaster is then greased or chalked in the usual way and the second half of the flask run in. The parts of the flask are now separated and the wax or other material which forms the temporary support for the teeth boiled out and the work packed and vulcanized. The gum-facings are then placed back in position upon the foundation previously formed by the gum-facings to receive the same, and in engagement with the half-portions of the pins c which project from the vulcanite of the denture, said pins c being received in the recesses b in the backs of the gum-facings. The gum-facings rest around the necks of the teeth as shown in Fig. 3 and are preferably retained in position on the foundation independently of the teeth, as for instance by a good oxyphosphate cement, the cement being placed on the pins and in the sockets and on the backs of the facings.

In cast-plate work, the facings and their pins and the teeth are set up on a wax foundation as above described and a mold is made by inserting the wax with the pins in position and projecting therefrom into a mixture of silex and plaster, inclosing same in a metal ring; this forms, after the wax has been burnt out, a suitable mold for the metal to be forced in under pressure by a suitable casting machine, thus securing a perfect reproduction in gold or other metal of the foundation and bed with the pins in position to which the facings are subsequently cemented.

In struck-plate or soldering work, the foundation plate is struck up and placed upon the model in the usual way. Wax is softened and placed on the front of the plate to form a bed for the facings which are temporarily fitted thereto. The teeth, which have been previously backed with metal, are set up in said wax. The facings are now removed and a model taken in plaster of the wax front with or without the teeth in position. A metal plate is struck up to the model of the wax front so as to fit the back of the facings and form a bed for same. Pins are soldered to said bed in positions corresponding to the recesses in the backs of the facings. The foundation plate, the metal bed for the facings and the metal-backed teeth are now invested in plaster and the whole soldered together. The plaster is then broken away and the denture trimmed up and polished. The gum-facings can now be replaced and secured in position by cement as above described.

Instead of the double-headed pins c above described, I may employ buttons or similar attaching means, or I may provide the sockets b of the gum-facings with internal screw threads and employ screwed pins adapted to pass through the denture from the inside of the plate. In some cases the double-headed pins, buttons or other attaching means may be attached to the facings for insertion in holes or sockets provided in the vulcanite or metal bed, or said pins may be dispensed with, the wax, which forms the temporary bed for the facings, being usually sufficiently adhesive to temporarily retain the facings in position during the fitting of the teeth. In this latter case the facings will be permanently secured by cement or gutta-percha.

Figs. 8 to 13 illustrate a modified form of my improved gum-facing as applied to that type of teeth known in the trade as "Robbin's crowns" or "tube teeth" (i. e. teeth adapted to be mounted on pins embedded in the vulcanite or other substance forming the foundation of the denture). In this case the teeth are not fitted to the denture until the vulcanizing process is completed. The foundation f of the denture is molded in wax as above described and the pins g on which the teeth are to be mounted are inserted in the wax. The gum-facings a, which are provided with holes h, are adapted to fit over the pins g onto the foundation as shown in Figs. 8 and 9. During the vulcanizing process the facings are removed, but can be again replaced and permanently secured on the foundation when the vulcanizing process is completed. The pins g serve to hold the gum-facings in proper position. The teeth are afterward fitted onto the pins in the well-known manner. The facings may be made as shown in Figs. 10 and 11, or, if desired, they may be provided with projections j adapted to fit between and fill up the spaces between the necks of adjacent teeth, as shown in Figs. 12 and 13.

The above described methods allow of easy and quick repair and obviate the necessity for vulcanizing, soldering, casting or heating the work with the gum-facings in position. The teeth can be readily adjusted at varying angles to allow of irregularity in appearance and bite.

The gum-facings are formed to go between and to receive one, two or any desired number of teeth, and may in some cases be of metal covered by a suitable enamel instead of porcelain as customary, or may be of glass, celluloid or similar material. The enameled metal gum-facings provided are comparatively thin and can be used in many cases where the thickness of porcelain necessary to obtain the required strength would be so bulky as to distort the natural contour of the lips.

With gum-facings and teeth fixed in accordance with this invention there is no pressure upon the gum-facings during the process of flasking as they are removed beforehand and, since they are removed, no damage can occur to them during the subsequent process. Further, by reason of the metal lining, a support for the arch is obtained which gives the necessary strength to the structure for any number of teeth during and after firing and in use.

By being able to remove the gum-facings during the vulcanizing or equivalent process, the various materials mentioned as being suitable for the facings can be used in connection with any kind of metal or vulcanite work which, previous to this invention, was not possible.

What I claim and desire to secure by Letters Patent is:—

1. The process of making dentures which consists in forming a foundation, then temporarily attaching a gum-facing to the foundation, then attaching teeth to the foundation, then removing said gum-facing, then permanently fixing the teeth in position, and then replacing and permanently fixing the gum-facing in position.

2. As a new article of manufacture, a gum-facing for dentures composed of a thin metal plate covered with enamel.

3. A denture comprising a foundation, teeth fixed to the foundation, and a gum-facing fixed to the foundation independently of the teeth.

4. A denture comprising a foundation, teeth fixed to the foundation, and a gum facing composed of a thin metal plate covered with enamel fixed to the foundation, the foundation being preformed by the gum facing to receive the same.

In witness whereof, I have hereunto signed my name in the presence of two subscribing witnesses.

ERNEST FOGG.

Witnesses:
HERBERT HOWARD,
GEORGE FORSTER.

Copies of this patent may be obtained for five cents each, by addressing the "Commissioner of Patents, Washington, D. C."